March 27, 1956 W. R. BURNS ET AL 2,739,646
APPARATUS FOR CUTTING STACKED PIECES OF MATERIAL
Filed May 15, 1951 3 Sheets-Sheet 1
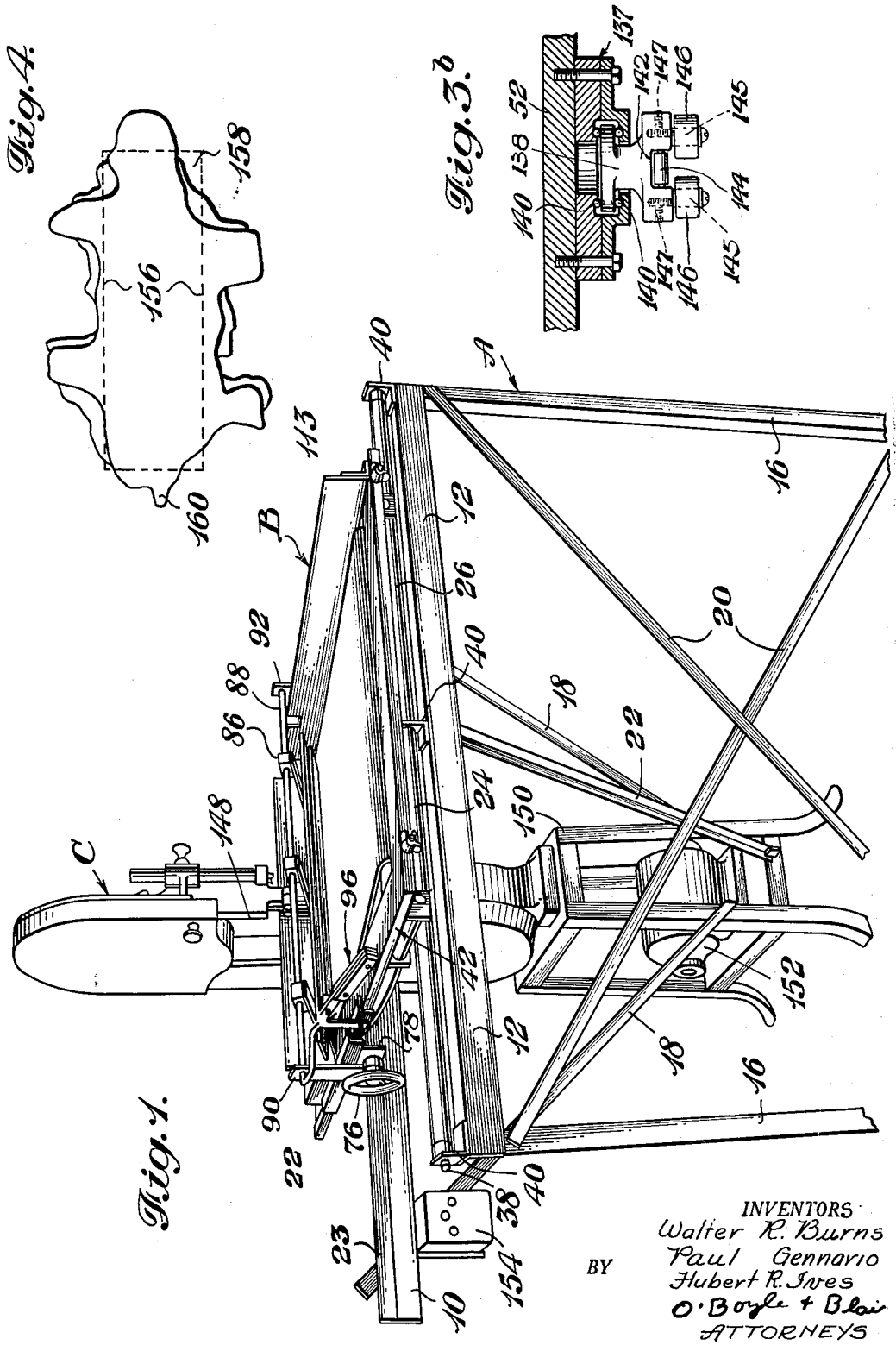
INVENTORS
Walter R. Burns
Paul Gennario
Hubert R. Ives
BY O'Boyle + Blair
ATTORNEYS

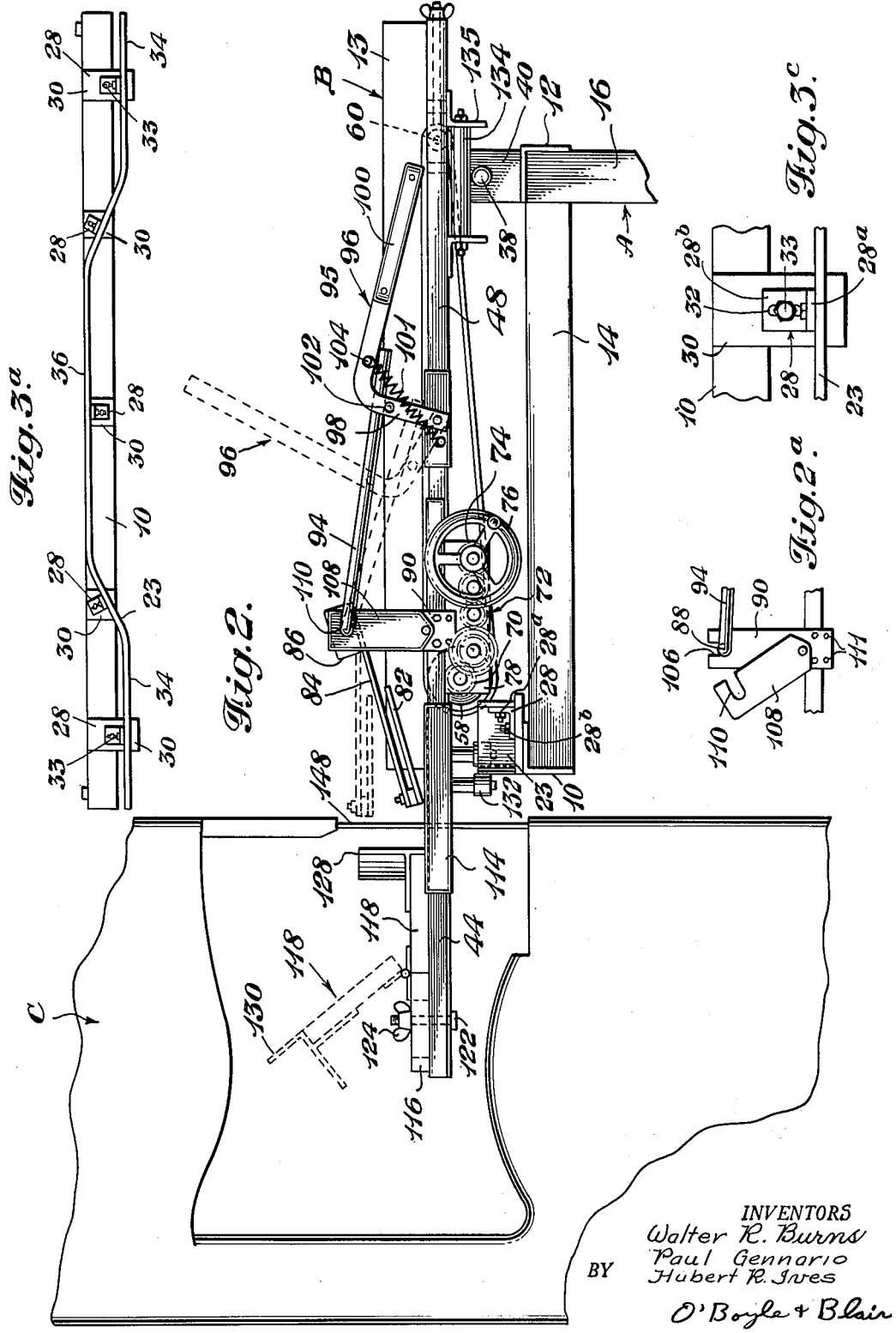

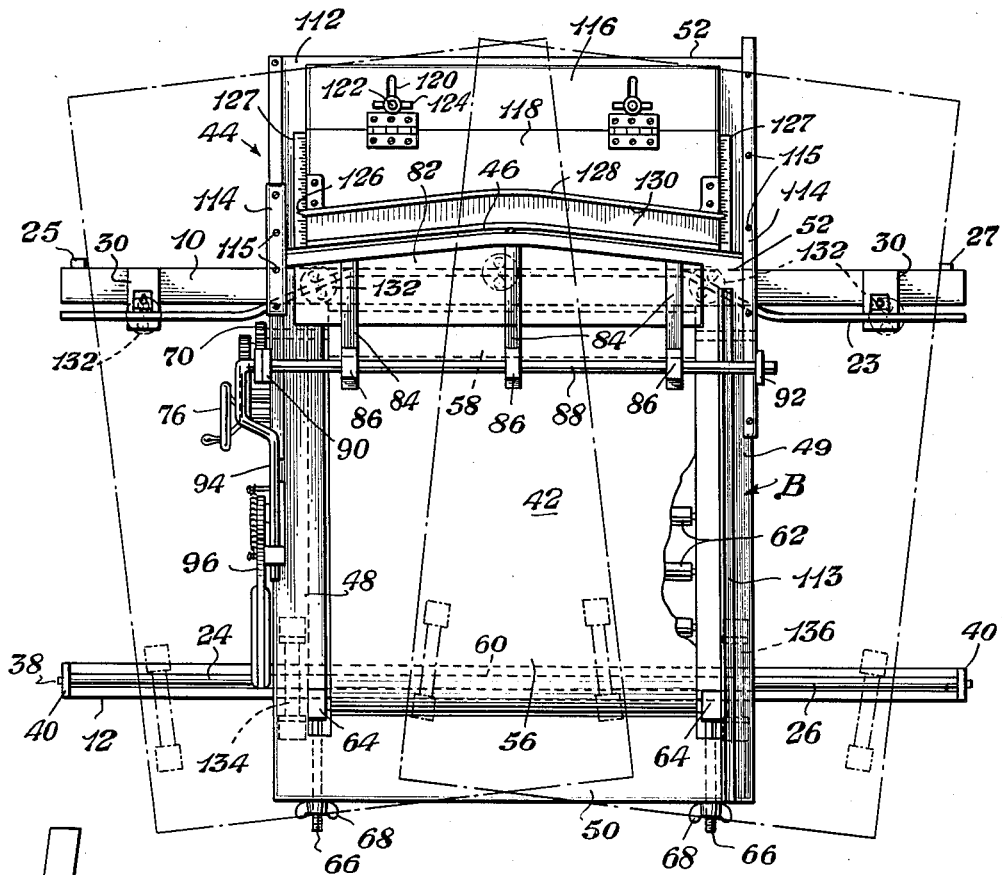
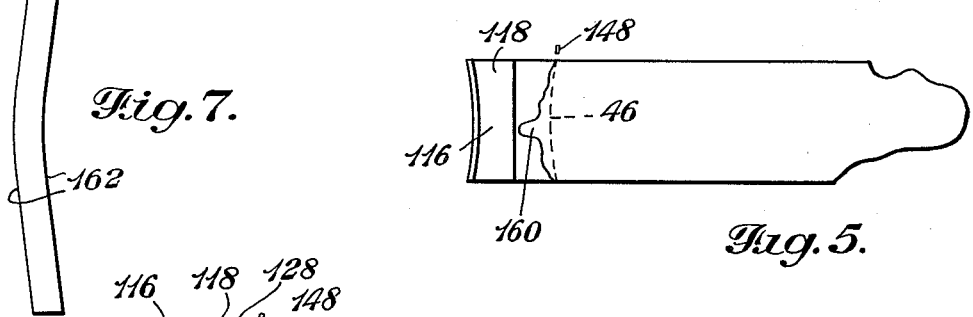
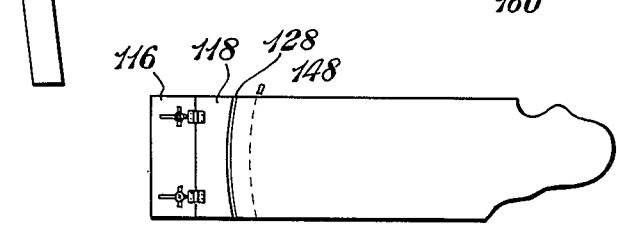

United States Patent Office 2,739,646
Patented Mar. 27, 1956

2,739,646

APPARATUS FOR CUTTING STACKED PIECES OF MATERIAL

Walter R. Burns, Bethel, Conn., Paul Gennario, Brewster, N. Y., and Herbert R. Ives, Danbury, Conn.

Application May 15, 1951, Serial No. 226,388

5 Claims. (Cl. 164—35)

The present invention relates to a method and means of simultaneously cutting a plurality of layers or stacked pieces of material into strips of predetermined size and shape. More particularly, the invention relates to method and apparatus for simultaneously cutting a plurality of stacked leather skins into strips of predetermined size and shape, so that when the ends of a strip are brought together, a hat sweat band is formed.

The cutting of leather into strips of predetermined size and shape to form sweat bands is basically old. Heretofore, however, it has generally been done by superimposing a pre-shaped pattern over the skins and then hand cutting around the pattern. This method is slow, laborious and costly for the reason that the most skillful worker can, at one time, only cut through approximately six layers of material.

In accordance with the present invention, a comparatively large number, several dozen, of layers of material may be simultaneously cut, initially trimming the material to provide parallel side edges spaced apart the length of the desired finished strip, then moving the stacked strips in a transverse and angular path while simultaneously cutting the same to obtain the desired lengthwise curvature, removing the severed strips, then moving the layers longitudinally a distance equivalent to the desired width and again cutting transversely and angularly. By following these steps, the material is reduced into strips all having the required length, width and shape.

An object of our invention is to provide an improved method and apparatus for cutting a plurality of layers or stacked pieces of material into strips of predetermined shape and size.

Another object of our invention is to provide a machine for cutting sweat bands for hats, wherein each successive cut will duplicate the previous one, thus assuring a standard product at all times.

A further object of our invention is to provide a machine for cutting sweat bands for hats, which may be readily, safely and rapidly operated by a single operator and not requiring unusual skill.

A still further object of our invention is to provide a machine for cutting sweat bands for hats which is of extremely simple construction, which has few moving parts, and which may be economically built and thereafter maintained.

With these and other objects in view, which may be incident to our improvements, the invention consists in the parts and combinations to be hereinafter set forth and claimed, with the understanding that the several necessary elements, comprising our invention may be varied in construction, proportions and arrangements, without departing from the spirit and scope of the appended claims.

In order to make our invention more clearly understood, we have shown in the accompanying drawing means for carrying the same into practical effect, without limiting the improvements in their useful applications to the particular constructions, which for the purpose of explanation have been made the subject of illustration.

In the drawings:

Figure 1 is a perspective view of the machine embodying the invention herein;

Fig. 2 is a side view of the machine with certain of the parts shown in different operating positions;

Fig. 2a is a detail view of part of the material clamping means;

Fig. 3 is a plan view of the machine shown in Fig. 1, the carriage and associated parts being shown by dotted lines in the positions they assume at the start and finish of a cutting operation;

Fig. 3a is a plan view of the guide track for guiding the parts to the different positions shown in Fig. 3;

Fig. 3b is a view partly in section of the guide and bearing means which cooperate with the track of Fig. 3a;

Fig. 3c is a view on an enlarged scale of a portion of Fig. 3a;

Fig. 4 is a view of a stack of skins which are to be cut;

Figs. 5 and 6 are diagrammatic views illustrating the initial loading and cutting operations of the device; and Fig. 7 is a plan view of a finished strip from which a sweat band is formed.

Referring to the drawings, the machine for carrying out the invention comprises generally a base or carriage support A, a carriage B which is transversely and angularly movable on the support A, and a cutting device C so associated with the carriage B, whereby upon transverse movement of the carriage the material supported thereon will be moved relative to and across the cutting device.

Considering the cutting end of the machine as the forward end, the base A includes a forward transverse frame member 10, and a rear transverse frame member 12 longitudinally spaced from each other and interconnected by a center longitudinal frame member 14 (Fig. 2). The frame members are supported at desired convenient height by means of vertical legs 16 depending from frame 12, and braces 18 diagonally depending from frame 10 and connected at their lower ends to the cutting device support. Additional rigidity may be given to the support by diagonals 20, interconnecting the legs 16, and a diagonal 22 interconnecting the center frame 14 with the cutting device support.

The arrangement of frame members 10, 12 and 14 form an I-shape which, as hereinafter becomes apparent, permits the operator freedom in transversely moving the carriage B, and in addition, ready access to the carriage in any transverse position. The frames, legs and braces may be suitable steel angles and strips rigidly secured in position as by welding, whereby maximum strength is obtained with minimum weight.

As best seen in Fig. 2, the frame members 10 and 12 are each arranged with one flange horizontal whereby the frame 10 constitutes a base for the carriage guide track 23 and the frame 12 a base for the carriage supporting rollers or bearing members 24 and 26 (Fig. 1). Referring initially to the guide track 23 (Fig. 3) it is in the form of a relatively thin vertically arranged steel strip member preshaped to provide the necessary curvature to obtain desired movement of the carriage B, and is sufficiently flexible to permit minor adjustment thereof. The track 23 is mounted on frame 10 by five right angle members 28 (Figs. 2 and 3a) with the track rigidly secured to the vertical leg 28a of each member and the horizontal leg 28b of each member secured to a plate 30 welded on the frame 10. Each horizontal leg is further provided with a slot 32 through which a locking stud 33 passes to permit such minor adjustment as may be required to flex the track into exact guiding position. By these adjustments the temple scopes may be increased or decreased to suit the particular design of the hats in which the sweat bands being cut are going to be used. The track 23 is co-extensive in length with frame 10 and is of irregular curvature having relatively straight end portions 34 and a central curved portion 36 whereby the carriage will be guided transversely and angularly through a desired path as hereinafter becomes apparent. To limit movement of the carriage B, end stops 25 and 27 are secured adjacent each end of frame 10. Referring now to the rollers 24 and 26, each is approximately one-half the length of frame 12 and both are rotatably mounted on a shaft member 38 supported by the vertical legs of end and central right angle members 40, the horizontal legs of these members being welded to frame 12. The rollers are separated by the central member 40 and being freely mounted on shaft 38 they may be simultaneously rotated in the same direction or in opposite directions for reasons hereafter apparent.

Supported and movable on the base A is the carriage B which is of rectangular shape and approximately half the width of the transverse supporting members, but substantially longer than the distance between the frame members. The carriage comprises two parts, the material supporting and carrying section 44 and the material stop and throw-off section 42, the forward edge of section 42 and rear edge of 44 being separated to define a curved slot 46 (Fig. 3) in which the cutting device cooperates.

Initially considering the conveying section 42 it comprises a rectangular open frame having side members 48 and 49, a rear cross or end member 50 and a front cross member 52. Positioned within the frame is a conveyor belt 56 mounted on a forward drive roll 58 (Fig. 2) and an after tensioning roll 60 and passing over a plurality of intermediate idler supporting rolls 62. The drive roll 58 and idlers 62 have their shafts supported in any suitable way on the frame members, but to maintain proper tension on the belt, the tension roll 60 has its ends rotatably mounted in bearing blocks 64 slidably mounted in the respective side frame members 48 and 49. These bearings are longitudinally adjusted by extension bolts 66 passing through the rear frame 50 and threaded at their outer ends to receive wing nuts 68.

Movement of the conveyor belt 56 is accomplished by rotation of the drive roll 58 (Fig. 2) and to do this the shaft of the drive roll is extended beyond the left frame member 48 and has mounted thereon a gear 70. The gear 70 connects through a chain of gears 72 to a gear 74 fixed to a shaft carrying the hand wheel 76, whereby upon rotation of the hand wheel, drive roll 58 will be rotated. The hand wheel 76 and gear train 72 are all mounted on a vertical supporting plate 78 depending from and secured to frame member 48, the hand wheel thus being positioned sufficiently back from the guide track to permit its ready operation.

With the above construction it will be seen that the conveyor belt and operating means therefor make it possible to conveniently move the material forward after being placed thereon. Obviously the weight of the material will be substantial and although it could be forced forward across the carrier, the conveyor is highly desirable as it both simplifies and speeds operation.

There is further associated with the material carrier section 42 a clamping means for securing and compressing the layers of material together in order to assure an even cut. The clamping means are carried above the conveyor belt and include a forward pressure plate 82 having its forward edge secured to a plurality of spring fingers 84 (Fig. 3) and its rear edge free. The rear ends of the spring fingers 84 are secured to blocks 86 whereby when pressure is exerted on the forward end of fingers 84, plate 82 will flatten against the material carried thereunder. To exert this pressure, shaft 88 is rotatably mounted in supporting arms 90 and 92 extending vertically from and bolted to the side frame members 48 and 49. The end of shaft 88 adjacent the conveyor operating wheel 76 is provided with a rearwardly extending lever 94, operated by a manually controlled lever 96. The lever 96 (see Fig. 2) has a short arm 98 and a long arm 100 at substantially right angles to one another. The end of the short arm 98 is pivotally mounted on the side of frame member 48 to position the long arm 100 toward the rear of the machine when in clamping position. Pivoting of arm 100 operates the clamping means, and to accomplish this, lever 96 is provided with a pair of inwardly extending lugs 102 and 104 positioned respectively just below the right angle on arm 98 and just above the right angle on arm 100. As seen in Fig. 2 lever 94 is sufficiently long to extend between the lugs 102 and 104 whereby upon movement of arm 100 the lugs will move lever 94. When arm 100 is pivoted clockwise, lug 102 will lift lever 94 moving it counter-clockwise and move plate 82 to clamping position. Upon pivoting arm 100 counter-clockwise, lug 104 will engage lever 94 moving it clockwise to lift the clamping plate. When in clamping position, arm 100 is under constant bias by a spring 101 having its opposite ends connected respectively to lug 104 and side frame member 44.

To permit rapid loading when placing a stack of material thereon, the clamping means are made readily removable. As shown in Fig. 2a, the vertical supporting arm 90 for shaft 88 is provided with an upwardly facing U-shaped notch 106 into which the shaft fits. To retain it in position there is pivotally mounted on arm 90 a clamp 108 having a rearwardly facing U-shaped notch 110 which permits clamp 108 to slide over shaft 88 and retain it in position. To remove the clamping means, it is only necessary to pivot clamp 108 counter-clockwise and lift shaft 88 out of bracket 90, whereupon it may then be withdrawn from the opposite bracket 92. The clamping means may also be raised to permit a greater number of layers of material to be placed thereunder, this being done merely by raising the brackets 90 and 92 to the next set of openings 111 therein. To further assist in positioning material on the conveyor the right frame member carries a longitudinally extending vertically arranged side positioning plate 113.

Referring now to the material stop and throw-off section 44, it comprises a substantially rectangular bottom member 112 (Fig. 3) of like width to the conveyor section and rigidly secured thereto by U-shaped angles 114 removably secured by bolts 115. Mounted on member 112 is a slide member 116 to which is hinged or otherwise pivotally secured the stop and throw-off member 118. The slide member 112 is provided with longitudinal slots 120 through which the studs 122 extend, the studs being secured to member 112, and carrying wing nuts 124, which may be readily slackened to permit adjustment of member 116. To permit adjustment, stop 118 is provided with pointers 126 overlying scales 127 fixed to support 112. The stop and throw-off member 118 further carries at its free end a vertical stop face 128 and throw-off plate 130 at right angles thereto, the upper face of plate 130 lying in the same plane as the top of the material conveyor.

As previously stated, the forward edge of the material carrier section 42 and the rear edge of the stop and throw-off section 44 are spaced to define the slot 46, the spaced edges of these members being respectively shaped to the curvature of the cut to be made in the material. In like manner, stop face 128 and throw-off plate 130 are simultaneously curved, and by longitudinally adjusting same with respect to scales 127 the width of the cut may be controlled.

The cutting of the material is accomplished by moving the carriage B relative to the cutting device C (Fig. 1). To do this the underside of the carrier is provided with forward bearing means 132 (Figs. 2 and 3) transversely spaced on the forward frame member 52 rearwardly of slot 46 and adapted to cooperate with the guide track 23 and rear bearing means comprising roller 134 and 136 longitudinally carried adjacent the rear ends of the side frame members and cooperating with the transverse support rollers 24 and 26.

More specifically, each forward bearing 132 (Fig. 3b)

includes a socket member 137 secured to the bottom of frame member 52 and in which there is rotatably mounted a guide support 138. The socket and support having cooperating top and bottom ball bearing races 140 to permit free rotation of the support 138, whereby it may adjust itself to track 23. The lower end of support 138 has a slot 142 within which is positioned a roll 144. A pair of ball bearing side rollers 146 are positioned on each side of slot 144. It will be noted that rollers 146 are mounted on eccentric shafts 145. Thus, the axes of rotation of rollers 146 may be adjusted toward and from track 23 so that rollers 146 fit snugly against the track. With the bearings 132 so constructed and spaced, they will, when positioned on the track, result in carriage B following the curvature of track 23 upon any transverse movement thereof and the forward end of the carriage B must therefore follow a predetermined path. Once shafts 145 have been adjusted they are held in position by set screws 147. Because of the manner in which bearings 146 are mounted on the table a plane passing through the axes of rotation of bearings 146 will always be at right angles to track 23. The rollers 144 carry the weight of the table and rollers 146 guide it so that friction is reduced to a minimum.

In order that the carriage B may follow such a predetermined path, the rear end thereof must be permitted universal movement. For this reason the rollers 134 and 136 (Fig. 3) are freely rotatable in suitable end flanges depending from and secured to the underside of the respective side frame members 48. In this way roller 134 overlies and engages the support roller 24 and roller 136 overlies and engages roller 26. From this, it will be seen that the rear end of carriage B is unrestrained and free to simultaneously slide and roll as the carriage is moved.

To complete the device, the cutting device C is a power driven band saw so positioned and arranged that the blade 148 is central of the guide track 28 and passes through the carriage slot 46. The saw is mounted on a suitable supporting stand 150 which also supports the saw motor 152, the latter being connected by proper wiring to a control box 154 suitably secured to the forward support member 12 in any suitable way. As the saw C may be any conventional commercial type, further description is not considered essential.

Considering the machine as described, it will be seen that the conveyor operating wheel 76, material clamping operating lever 96 and motor control 154 are all positioned to the left or operating side of the machine, as viewed in Fig. 1. Because of this, the initial position of the carriage for the start of an operation is in the left dotted position of Fig. 2, with the cutting blade 148 at the extreme right of slot 46.

In carrying out the method hereof, a plurality of skins, which may be approximately six dozen, or more, are initially stacked into a pile, as indicated in Fig. 4, the stack being built up on a heavy sheet of cardboard 158. The skins are initially cut longitudinally to provide opposite parallel edges 156, the width therebetween corresponding to the desired length of a sweat band. The stack of skins are then placed on the conveyor belt with one of the parallel edges against side plate 113, the clamping plate 82 being lifted or removed as necessary and the carriage being to the left or in starting position. If removed, the clamping means are next replaced upon loading of the machine.

As the forward ends 160 of the skins are irregular stop member 118 is thrown back (Figs. 2 and 5) and conveyor wheel 76 operated to move the stack forward until the full width overlies slot 46. At this point, the clamping means are moved to clamping position to compress and firmly hold the stack for the first cutting operation.

With the carriage in starting position, the blade 148 is at the leading end of slot 46, whereupon the carriage B is moved from the left to the right, as seen in Fig. 3. It will be seen that when in initial position, the longitudinal center line of the carriage B is at an acute angle to the left of the center line of the machine, and as the carriage B moves transversely, this angle will be reduced until the carriage is on dead center, and thereafter the center line will make an increasingly larger acute angle to the right until the travel of the table is complete. This movement results from the cooperating action as the carriage bearing or guide members 132 are moved across track 23. In the starting position of the carriage, the left guide member 132 will be adjacent the left end of track 23 on the straight position 34 (Fig. 3a), whereas the right member 132 will be adjacent the center of the curved portion 36. The positions will be reversed as the carriage B moves through from start to finish, simultaneously moving the carriage angularly and transversely.

As the forward movement of the carriage through a predetermined fixed path occurs, the rear end is free to follow as necessary. When movement starts the left rear carriage roller 134 will rotate clockwise, as seen from the rear, whereas the supporting roller 24 will be rotating counter-clockwise, as seen from the left, due to roller 134 being carried forward by the carriage. Although the right carriage roller 136 is also rotating clockwise, the supporting roller 26 will be rotating counter-clockwise due to roller 136 being carried rearwardly. However, as the carriage B passes center, the rotation of rollers 24 and 26 will be reversed. By reason of this unrestrained mounting it becomes apparent that the rear end of the carriage will follow any movement of the front end, allowing track 23 and slot 46 to be changed as desired to produce different curvatures.

As the carriage is moved from left to right, the saw 148 will sever the leathers and the bottom cardboard, the latter being used to prevent the teeth of the saw from tearing the lowermost skin. Upon completing the initial cut, the carriage is returned to the left whereupon the cut off material is removed and member 118 lowered to stop off position (Figs. 2 and 6). The clamping means are now released and the stack moved by turning wheel 76 until the forward edges abut the stop face 128. With stop member 118 properly adjusted the distance between it and slot 46 is the width of the desired strip. The clamping means are again closed and the cutting operation repeated. The cut off material is removed by raising member 118, the stack of bands resting on plate 130. Each finished band (Fig. 7) has longitudinal edges 162 of like curvature. When so cut, upon bringing the parallel ends into engagement, a band of proper shape results.

Although the invention has been described with particular relation to the cutting of strips which may be utilized as hat bands, it is evident that by varying the path of movement of the forward end of the carriage by replacing track 23 with another pre-shaped track, many other articles might be cut, such as fitted men's belts, leather shoe soles, etc. In addition, by constructing the machine in the manner described and by supporting the carriage on free running rollers it is easily and rapidly manipulated by a single workman. Thus, it will be seen that the several objects hereinabove mentioned, as well as many others, have been successfully accomplished.

As many possible embodiments may be made of the above invention and as many changes might be made in the embodiment above set forth, it is to be understood that all matter hereinbefore set forth or shown in the accompanying drawings is to be interpreted as illustrative and not in a limiting sense.

We claim:

1. In a device of the character described, a horizontally arranged carriage, a support beneath the carriage, said carriage having a curved slot adjacent to the forward end thereof extending substantially the width of the carriage, a longitudinal conveyor rearwardly of the slot for conveying material across the slot, a cutting device positioned within the slot, cooperating guide means on the top of the support and bottom forward end of the carriage for guiding the carriage in a transverse and angular path past the cutting device, and cooperating pivotal means on the bottom of the rear end of the carriage and on the support at the rear end thereof allowing free unrestrained transverse and angular movement of the rear end of the carriage.

2. In a device of the character described, a rectangular carriage, said carriage having a curved slot adjacent the forward end thereof extending substantially the width of the carriage, a longitudinal conveyor rearwardly of the slot for conveying material across the slot, a vertical stop forwardly of the slot having a like transverse curvature thereto for stopping forward movement of the conveyed material, a cutting device positioned within the slot, means supporting the forward end of the carriage for movement in a transverse and angular path throughout the length of the slot and in a path corresponding to the curvature thereof, and cooperating pivotal means on the bottom of the rear end of the carriage and on the support at the rear end thereof allowing free unrestrained transverse and angular movement of the rear end of the carriage.

3. In a device of the character described, a rectangular carriage, said carriage having a curved slot adjacent the forward end thereof extending substantially the width of the carriage, a longitudinal conveyor rearwardly of the slot for conveying material across the slot, a vertical stop forwardly of the slot having a like transverse curvature thereto for stopping forward movement of the conveyed material, clamping means positioned above the conveyor means for clamping and compressing material carried thereon, a cutting device positioned within the slot, means rearwardly of the cutting device supporting the forward end of the carriage for movement in a transverse and angular path throughout the length of the slot and in a path corresponding to the curvature thereof, and cooperating pivotal means on the bottom of the rear end of the carriage and on the support at the rear end thereof allowing free unrestrained transverse and angular movement of the rear end of the carriage.

4. In a device of the character described, a rectangular carriage including a curved transverse slot adjacent the forward end thereof, a longitudinally extending conveyor belt located rearwardly of the slot for conveying material thereacross, a vertical stop member forwardly of the slot and of like transverse curvature thereto for limiting forward movement of the conveyed material, means for adjusting said stop member toward or away from the slot to vary the width therebetween, a pair of transversely spaced guide bearing members depending from the carriage rearwardly of the slot, a pair of transversely spaced longitudinally extending roller members depending from the carriage rearwardly of the guide members, a support for the carriage including a transversely extending forward guide track engaged by the carriage guide members and on which the carriage is movable from one side to the other through approximately twice its width, a rear support comprising a pair of transversely supported roller members on which the longitudinal rollers of the carriage are respectively supported, and a cutting device associated with the carriage and positioned within the leading end of the carriage slot when the carriage is at starting position at one end of the guide track, the guide track having a curvature such that when the carriage is moved from one side to the other it moves in a transversely and angular path corresponding to the curvature of the carriage slot.

5. In a device of the character described, a rectangular carriage including a curved transverse slot adjacent the forward end thereof, a longitudinally extending conveyor belt located rearwardly of the slot for conveying material thereacross, clamping means positioned above said conveyor means for clamping and compressing the material thereon, a vertical stop member forwardly of the slot and of like transverse curvature thereto for limiting forward movement of the conveyed material, means for adjusting said stop member toward or away from the slot to vary the width therebetween, means pivotally mounting said stop face for movement out of the path of conveyed material, a pair of transversely spaced guide bearing members depending from the carriage rearwardly of the slot, a support for the carriage including a transversely extending forward guide track engaged by the carriage guide members and on which the carriage is movable from one side to the other through approximately twice its width, a rear support comprising a pair of transversely supported roller members on which the longitudinal rollers of the carriage are respectively supported, and a cutting device associated with the carriage and positioned within the leading end of the carriage slot when the carriage is at starting position to one end of the guide track, the guide track having a curvature such that when the carriage is moved from one side to the other it moves in a transversely and angular path corresponding to the curvature of the carriage slot.

References Cited in the file of this patent

UNITED STATES PATENTS

| Number | Name | Date |
|---|---|---|
| 106,006 | Watkins | Aug. 2, 1870 |
| 465,435 | Bryer | Dec. 15, 1891 |
| 691,612 | Dods | Jan. 21, 1902 |
| 976,757 | Sylvester | Nov. 22, 1910 |
| 1,646,129 | Wagner | Oct. 18, 1917 |
| 1,712,269 | Hanauer | May 7, 1929 |
| 1,745,060 | Russell | Jan. 28, 1930 |
| 1,895,274 | Alexander | Jan. 24, 1933 |
| 2,022,799 | Blosser et al. | Dec. 3, 1935 |
| 2,120,251 | Johnson | Jan. 14, 1938 |
| 2,196,257 | Dubilier | Apr. 9, 1940 |
| 2,323,770 | Hazelton | July 6, 1943 |